Feb. 17, 1953     G. R. ERICSON ET AL     2,628,808
LUBRICATED VALVE WITH LUBRICANT VENT
Filed Oct. 9, 1945
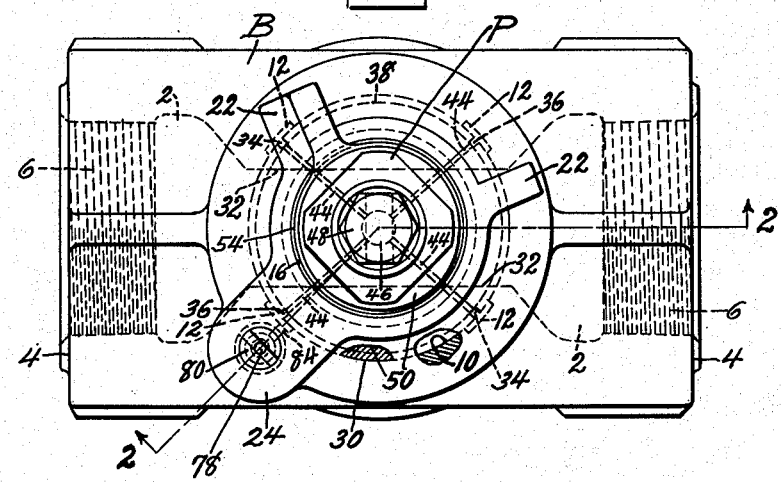
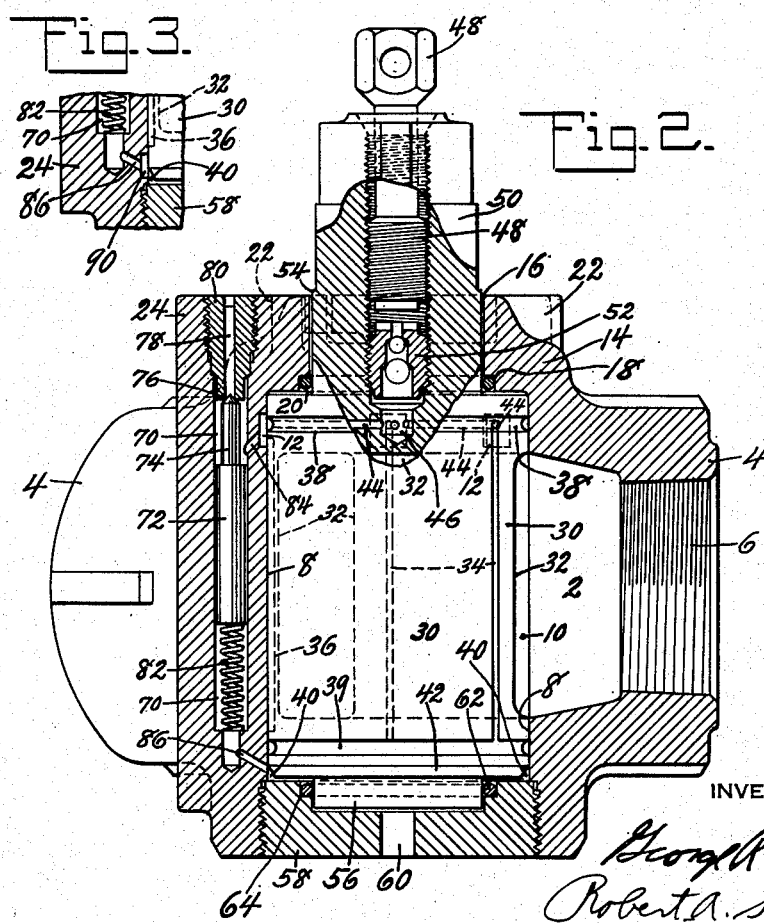
INVENTORS
*George R. Ericson*
*Robert A. Shields*

Patented Feb. 17, 1953

2,628,808

UNITED STATES PATENT OFFICE 2,628,808

LUBRICATED VALVE WITH LUBRICANT VENT

George R. Ericson, Kirkwood, Mo., and Robert A. Shields, Bloomsburg, Pa., assignors to American Car and Foundry Company, New York, N. Y., a corporation of New Jersey Application October 9, 1945, Serial No. 621,214

10 Claims. (Cl. 251—93)

This invention relates to valves in general and in particular to cylindrical plug valves of the lubricated type.

Lubricated plug valves have been constructed in the past with tapered plugs utilizing the force of the lubricant to jack the tapered plug from its seat for the purpose of making the plug easier to turn, while at the same time venting excess lubricant pressure, thereby preventing bursting of the body. In cylindrical plug valves there could be no true jacking of the plug but a longitudinal shift could be obtained which could be utilized to permit escape of excess lubricant and again prevent bursting of the valve body. This latter type valve required an unbalanced plug with the line pressure forcing the plug against a shoulder seal, thus producing a valve which became impossible to turn even in small sizes when line pressures went above approximately 500 pounds. With balanced cylindrical plugs the turning effort can be very materially reduced, but the act of balancing eliminates any possibility under the old system of relieving excess lubricant pressures automatically and in accordance with changes in line pressures. It is an object, therefore, of the present invention to provide a fully balanced, fully lubricated plug valve having relief means operating automatically and in direct accordance with changes in line pressures.

A further object of the invention is the provision of a lubricated valve having a safety means for venting excess lubricant from the valve and which safety means is operable by differences in pressure at different points in the valve.

A still further object of the invention is the provision of a lubricated valve having a safety device associated therewith and operable by the pressure differential existing between the head and base portions of the valve to vent lubricant from the valve.

These and other objects of the invention will be apparent to persons skilled in the art from a study of the following description and accompanying drawings, in which Fig. 1 is a plan view;

Fig. 2 is a sectional view taken substantially on line 2—2 of Fig. 1, and

Fig. 3 is a sectional view also taken substantially on line 2—2 of Fig. 1 of a portion of the valve disclosing a slight modification thereof.

Referring now to the drawings in detail, it will be seen that the valve is made up of two main parts, namely, the body B and plug P. The body, as clearly shown, is formed with a body passageway 2 extending through the attaching lips or flanges 4, which in the present case are equipped with threads 6 by means of which the valve body may be attached to the adjacent piping or fixtures. Extending substantially at right angles to the axis of the body passageway 2 is a cylindrical bore 8 which is adapted to receive the plug later to be described. This cylindrical bore 8 is carefully machined or surfaced to provide a body seating surface 10 adapted to cooperate with the seating surface of the plug. As shown the seating surface 10 is interrupted by four shallow depressions or dwarf grooves 12 located adjacent the head portion 14 of the body. This head portion overlaps the cylindrical bore 8 and partially closes the same and is formed with a cylindrical opening 16 adapted to receive the stem of the plug later to be referred to. The lower or inner end of opening 16 is enlarged as at 18 to receive an O ring 20 made of a suitable material capable of withstanding the line fluid and temperatures to which it will be subjected. This ring may be selected from the vast group of plastics now available, some of which are capable of withstanding practically all substances being piped at present and all practical temperatures. The valve body, as clearly shown, has lugs 22 projecting therefrom for the purpose of limiting the plug rotation to 90 degrees by cooperating with a stop extending from the plug. The body is also provided with an enlargement 24 for a purpose later to be described.

The valve plug in the present instance is of the cylindrical type, having a cylindrical seating surface 30 interrupted by the ends of plug passageway 32 and is so made that the seating surface 30 closely cooperates with the seating surface 10 of the body. The plug seating surface is also interrupted by two relatively long longitudinally extending grooves 34 located adjacent diametrically opposite edges of passages 32, as well as by two relatively short longitudinally extending grooves 36 located adjacent the other diametrically opposite edges of passage 32. The relatively long grooves 34 have their upper ends in constant communication with an upper circumferential groove 38 interrupting the plug seating surface adjacent the upper end thereof. The lower ends of these relatively long grooves also are in constant communication with a lower circumferential groove 39 interrupting the plug seating surface adjacent the lower end of the plug which is formed with a tapering end 42 to provide a space 40. Insofar as the plug is concerned, the short grooves 36 do not connect with either the circumferential grooves 38 or 39.

However, when the valve is either in the full open or full closed position the upper ends of grooves 36 overlap the diametrically opposite dwarf grooves 12 which then connect circumferential groove 38 to the longitudinal grooves 36, thus lubricant can be fed to all of the longitudinal grooves when the valve is in full open or closed position, but can not be fed to grooves 36 in any intermediate position. In this manner washout of lubricant is prevented as the grooves 36 move past the body passageways 2. Lubricant can be fed to the circumferential groove 38 by radial holes 44 extending from adjacent the upper ends of grooves 34 into cavity 46. The cavity 46 is supplied with lubricant placed under pressure by screw or ram 48 which operates in a bore formed in the stem 50 of the plug. Since the lubricant in the grooves will be more or less subjected to line pressures, a ball check 52 is inserted in the lower end of the bore and will prevent flow of lubricant out of the valve while permitting flow into the valve. The stem 50 is provided with a square end adapted to receive a wrench, gear or other operating means and is preferably formed as an integral part of the valve body. As clearly shown, the stem is increased in diameter slightly to provide a cylindrical portion 54 adapted to fit within opening 16 of the body with sufficient clearance to prevent contact between the two parts. This cylindrical part 54 of the stem is of proper diameter to closely cooperate with the O ring 20 and slightly compress the same between the part and the wall of enlarged opening 18 of the body. The lower end of the plug is formed with a cylindrical extension 56 of substantially the same area as the cylindrical portion 54 of the stem and this cylindrical extension is adapted to fit within a recess formed in base plug 58 screwed or otherwise fastened into the lower end of the body bore 8. The base plug is preferably provided with an opening 60, permitting atmospheric pressure to act on the cylindrical extension 56. This opening 60 may be closed by a fine screen or light ball check so as to prevent ingress of dirt to the valve body, while permitting easy egress of any possible leakage from the valve body. As shown, the extension 56 closely engages a bottom O ring 62 and slightly precompresses the same against the walls of an enlarged bore 64 formed in the base plug. As clearly shown, there is a slight clearance between the cylindrical extension 56 and the base plug 58, which clearance is substantially the same as that appearing between the head portion of the body and the cylindrical portion 54 located at the stem end of the valve plug. These clearances are so chosen that there can be no metallic contact between the cylindrical portions 54, 56 and the adjacent surfaces of the body when the plug is shifted radially in the bore due to line pressure acting thereon. The clearances are also so chosen in conjunction with the material of the O rings that there can not be excessive extrusion of the O ring material into the clearance spaces.

From the preceding it will be seen that the valve plug is balanced in the body since cylindrical portions 54 and stem 50 are of the same area as cylindrical extension 56 at the base of the plug and both are subjected to atmospheric pressures. Leakage of any line fluid past the cylindrical portions 54, 56 is prevented by O rings 20 and 62. The slight precompression of these O rings prevents any initial leakage past the rings and as the pressure builds up behind these rings they gradually distort increasing the compression against the walls of their space and eventually under high pressure they may start to extrude into the space between the cylindrical portions 54, 56 of the plug and the cooperating surface of the body. It will thus be seen that the O rings of themselves seal the stem and base portions of the plug, while the lubricant acts merely to prevent the leakage between the ports of the body when the valve is closed, while also acting to relieve friction during turning of the valve.

With the valve parts as just described lubricant forced into the plug could not escape and excessive pressures could build up causing the valve body to fail. For this reason the relief device now to be described has been placed within the projection 24 of the body. As clearly shown, this projection is bored as at 70 to receive a reciprocating plug or piston 72, from one end of which projects a stem 74 terminating in a conical section adapted to cooperate with a similar conical surface 76 formed adjacent the lower end of a passage 78 formed in closure plug 80 threaded or otherwise secured in the upper end of bore 70. The piston portion 72 is made relatively long and has rather close engagement with the walls of bore 70 to obviate any necessity for packing, although if leakage should occur it can easily be prevented by use of a small O ring or similar device located in a groove in the piston and cooperating with the walls of bore 70. A spring 82 located within the bore constantly urges the piston upwardly so that the conical surfaces 76 will be in engagement and prevent escape of material out of passageway 78. In other words, this device will operate as a spring seated needle valve. In order that pressure may be applied to the needle valve, an upper passage 84 joins one of the dwarf grooves 12 with bore 70, and this passage may be readily made by insertion of a drill diagonally through opening 16 in the valve head. A similar passage 86 may be drilled joining the space 40 with the lower end of bore 70 below piston 72. The piston 72 will thus be subjected to line pressure acting on the bottom portion of the piston as well as to line pressure and lubricant pressure acting on the upper end of the piston. That line pressure exists in space 40 and groove 38 will be obvious when it is considered that the valve body is closed and there is a slight radial shift of the plug in the body under pressure thus establishing line pressure in the space 40 and groove 38. The areas acted on, however, are different due to the projection of extension 74 from the upper end of the piston, and it will also be apparent that the lubricant pressure in 84 will have to be higher than the line pressure in space 40 during lubrication of the valve and the piston can accordingly move downwardly permitting escape of excess lubricant through passage 78. If for any reason line fluid, such as gasoline, water, or a similar substance, leaks past the valve plug and enters passages 84 and 86, the differential pressures acting on piston 72 added to spring 82 will prevent any leakage out of passage 78. During lubrication of the valve, however, the lubricant pressure will build up in 84 to such a point that it will force the piston downwardly against the combined pressure of spring 82 and line pressure in space 40.

In certain cases it may be desirable to eliminate the bottom circumferential groove 39 as shown in Fig. 3 thus permitting the space 40 to be enlarged slightly. Also to insure connection of 86 to space 40 an enlargement 90 may be provided thus overcoming inaccuracies in machining. It is obvious that the long grooves 34 will communicate with the enlargement 90 during rotation of the valve plug and will be in registry therewith when the valve is in closed position.

From the preceding description it will be seen that the valve plug is fully lubricated in order to reduce friction of turning and prevent leakage between the body ports, and also that the plug is fully balanced and sealed against leakage by the special packing rings 20 and 62, which rings will of themselves seal against leakage of line material even though all lubricant should be out of the valve. Of course, the presence of viscous lubricant in the valve may assist the rings in sealing since they will be subjected to slightly less pressure than if the line pressure acted direct, that is, the drag of lubricant located between the seating surfaces of the plug and body will materially reduce the pressure which can act on the sealing rings, but they are so designed as to be capable of withstanding the entire line pressure without lubricant. In case the valve is not lubricated slight leakage of line fluid into passages 84 and 86 can not cause operation of the piston 72 since the pressures will be substantially equal at the top and bottom, with the bottom area being much larger than the top area. In other words, the piston 72, together with its connected valve stem, operates as a safety device normally biased onto its seat by line pressure, but being capable of moving off of its seat during lubrication of the valve to vent excess lubricant and at a lubricant pressure of a predetermined amount higher than line pressure. In other words, the piston 72 and its connected parts will operate as a safety valve operable in accordance with changes in differential pressures existing between the head and base portion of the plug, these differential pressures being established during lubrication of the valve.

While the valve and safety device have been described more or less in detail, it will be obvious that various modifications and rearrangements of parts may be made in accordance with the following claims defining the invention.

What is claimed is:

1. In a lubricated valve the combination of a valve body having a passageway therethrough for the flow of matter under pressure, a bore formed in the body and intersecting said passageway, a valve plug seated in said bore and rotatable to control the flow of matter through the body passageway, a lubricant system for supplying lubricant to the surface of said valve plug, means for supplying lubricant under pressure to the lubricant system adjacent one end of the bore, means for permitting access of line pressure to the other end of the bore, and additional means operable by differential pressure existing between the opposite ends of said bore during lubrication of the valve by said first named means to vent excess lubricant from the system.

2. In a lubricated valve of the balanced type, the combination of a valve body having a passageway therethrough for the flow of matter under pressure, a bore formed in the body and intersecting said passageway, a valve plug seated in said bore and rotatable to control the flow of matter through the body passageway, stems projecting from opposite ends of said valve plug and subject to atmospheric pressure at their ends, sealing means closely engaging said stems and body to prevent escape of matter past said stems, a lubricant system for supplying lubricant to the surface of said valve plug, means on one of said stems to supply lubricant under pressure to said lubricant system, a second bore formed in said body, valve means in said second bore and including a piston normally biased to prevent escape of matter out of said second bore, a first passage connecting one end of the piston to the lubricant system, and a second passage connecting the other end of the piston to said first named bore at a point removed from the lubricant system.

3. In a lubricated valve of the balanced type, the combination of a valve body having a passageway therethrough for the flow of matter under pressure, a bore formed in the body and intersecting said passageway, a valve plug seated in said bore and rotatable to control the flow of matter through the body passageway, stems projecting from opposite ends of said valve plug and subject to atmospheric pressure at their ends, sealing means closely engaging said stems and body to prevent escape of matter past said stems, a lubricant system for supplying lubricant to the surface of said valve plug, means on one of said stems to supply lubricant under pressure to said lubricant system, a second bore formed in said body, an unbalanced needle valve slidable in said second bore and normally biased to prevent escape of matter from the second bore, said needle valve being formed to provide a relatively large pressure area on the lower end and a relatively smaller pressure area on the upper end, a passage connecting the larger pressure area to the first named bore at a point disconnected from said lubricant system, and a second passage connecting the smaller pressure area to the lubricant system adjacent the means for supplying lubricant to the system.

4. A valve comprising a housing, a passageway for the flow of matter under pressure through said housing, a transverse cylindrical bore between the ends of said passageway, a cylindrical valve plug rotatably mounted in said bore, means forming shoulders at each end of the bore, said shoulders having concentric openings through which portions of the ends of the plugs may be exposed to atmospheric pressure to balance the plug, sealing means to prevent leakage at said openings regardless of longitudinal shifting of the plug, said plug having a passageway therein adapted to register with said first-named passageway when the plug is in one position, said plug being adapted to close said passageway when the plug is in another position, grooves surrounding one of said passageways in the housing when it is closed by the plug, means for filling said grooves with lubricant under pressure, and means including a valve operable by differential pressure for limiting the amount of pressure which can be developed in said grooves, said means being normally urged towards seating position by pressure from the flow of matter and being moved towards open position by lubricant pressure when said plug is in a position closing said passageway.

5. A lubricated valve comprising a body member having a passage interrupted by a transverse bore, a plug in said bore provided with means for opening or closing communications between the ends of said passage for controlling the flow of matter under pressure, said plug having an operating stem, pressure lubricating means for said valve, signal means for indicating when the valve is sufficiently lubricated comprising a passageway in the body member of the valve having an outlet adjacent the stem end of the plug, and means for causing the discharge of lubricant from said passageway during lubrication of the valve and when said valve has been sufficiently lubricated irrespective of pressure changes in said passage, said means including a vent passage connecting the pressure lubricating means with atmosphere and a valve controlling said vent passage and operable in opening direction by lubricant pressure, said valve being urged toward closed position by pressure of said matter controlled by said plug.

6. A lubricated valve adapted to be connected to a pipe line and comprising a body member having a passage interrupted by a transverse bore, a plug in said bore provided with means for opening or closing communications between the ends of said passage, said plug having an operating stem, pressure lubricating means for said valve, signal means for indicating when the valve is sufficiently lubricated irrespective of pipe line pressure comprising a passageway having an outlet to the exterior of the valve adjacent the stem end of the plug, and means including a pressure responsive valve for causing the discharge of lubricant from said passageway when said valve has been sufficiently lubricated irrespective of pipe line pressure, said signaling means being so constructed and arranged as to operate only when a lubricant pressure in excess of pipe line pressure has been established by said pressure lubricating means.

7. A lubricated valve comprising a body member having a passageway therethrough for the flow of material under pressure, a cylindrical bore formed in the body and intersecting said passageway, a valve plug seated in said bore and rotatable to control the flow of matter through the passageway, an annular chamber at one end of said bore, said chamber being normally exposed to the highest pressure existing in said passageway, a lubricating groove system for said valve, means to supply lubricant under pressure to said groove system, and pressure relief means for said lubricating groove system, said pressure relief means comprising a movable member having one portion exposed to lubricant pressure adjacent said means to supply lubricant and an opposing portion exposed to the pressure in said chamber.

8. In a lubricated valve the combination of a valve body having a cylindrical bore, a valve plug in said bore, said plug having ports therein and a cylindrical portion, a plurality of passages in said valve body and opening into said bore, said plug being adapted to seal said passages, a system of lubricating grooves, pressure means for feeding lubricant into said grooves, relief valve means for limiting the pressure of the lubricant, a chamber in said valve remote from said pressure means and containing a pressure corresponding to the highest pressure existing in said passages, said relief valve means comprising piston means having a portion exposed to the pressure of the lubricant adjacent said pressure means and another portion exposed to the pressure in said chamber and acting in opposition to the pressure of the lubricant.

9. In a lubricated valve the combination of a valve body having a passageway therethrough for the flow of matter under pressure, a bore formed in the body and intersecting said passageway, a valve plug seated in said bore and rotatable to control the flow of matter under pressure through the body passageway, said valve plug being subject to line pressure at one end portion, a lubricant system for supplying lubricant to the surface of said valve plug, including spaced lubricant passages at the ends of said plug, means for supplying lubricant under pressure to the lubricant system, and additional means mounted on the valve body and including a relief duct connecting the lubricating system to atmosphere and a vent valve controlling said duct, said vent valve being connected with the line pressure at the end of the valve plug for movement in closing direction and with the lubricant system for movement in the other direction for venting excess lubricant from the lubricant system automatically in accordance with an increase in pressure in the lubricant system above the line pressure at the plug end.

10. In a lubricated valve of the balanced type, the combination of a valve body having a passageway therethrough for the flow of matter under pressure, a bore formed in the body and intersecting said passageway, a valve plug seated in said bore and rotatable to control the flow of matter through the body passageway, stems of less diameter than the valve plug projecting from opposite ends of same and subject to atmospheric pressure at their ends, sealing means closely engaging said stems and body to prevent escape of matter past said stems, means supplying line pressure to end portions of said plug, a lubricant system including lubricant passages adjacent the ends of the plug for supplying lubricant to the surface of the plug, means on one of said stems to provide lubricant under pressure at points adjacent said last-named stem to said lubricant system, and valve means on said body connected to said lubricant system at the lubricant supply end and to atmosphere, said valve means being connected to said line pressure and operable by differential pressure existing between the lubricant system and the line pressure during supplying of lubricant thereto to vent excess lubricant from the system.

GEORGE R. ERICSON.
ROBERT A. SHIELDS.

REFERENCES CITED

The following references are of record in the file of this patent:

UNITED STATES PATENTS

| Number | Name | Date |
|---|---|---|
| 2,038,889 | Clade | Apr. 28, 1936 |
| 2,043,863 | Nordstrom | June 9, 1936 |
| 2,319,943 | Nordstrom | May 25, 1943 |